United States Patent
Lee et al.

(10) Patent No.: US 9,699,829 B2
(45) Date of Patent: Jul. 4, 2017

(54) METHOD FOR APPLYING TIMER FOR DISCONTINUOUS RECEPTION PROCEDURE IN WIRELESS COMMUNICATION SYSTEM AND AN APPARATUS THEREFOR

(71) Applicant: LG ELECTRONICS INC., Seoul (KR)

(72) Inventors: Sunyoung Lee, Seoul (KR); Sungjun Park, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 14/759,382

(22) PCT Filed: Jan. 10, 2014

(86) PCT No.: PCT/KR2014/000304
§ 371 (c)(1),
(2) Date: Jul. 6, 2015

(87) PCT Pub. No.: WO2014/112751
PCT Pub. Date: Jul. 24, 2014

(65) Prior Publication Data
US 2015/0359035 A1    Dec. 10, 2015

Related U.S. Application Data

(60) Provisional application No. 61/753,386, filed on Jan. 16, 2013.

(51) Int. Cl.
| | | |
|---|---|---|
| *H04W 76/04* | (2009.01) | |
| *H04W 76/06* | (2009.01) | |
| *H04W 52/02* | (2009.01) | |

(52) U.S. Cl.
CPC ..... *H04W 76/048* (2013.01); *H04W 52/0235* (2013.01); *H04W 76/068* (2013.01); *Y02B 60/50* (2013.01)

(58) Field of Classification Search
CPC .......... H04W 76/048; H04W 52/0235; H04W 76/068; Y02B 60/50
(Continued)

(56) References Cited

U.S. PATENT DOCUMENTS

| | | | |
|---|---|---|---|
| 2008/0186892 | A1 | 8/2008 | Damnjanovic |
| 2010/0110897 | A1* | 5/2010 | Chun .................. H04L 43/0811 370/241 |

(Continued)

FOREIGN PATENT DOCUMENTS

| | | | |
|---|---|---|---|
| JP | 2010-519793 A | 6/2010 | |
| JP | 2011-520341 A | 7/2011 | |

(Continued)

*Primary Examiner* — Obaidul Huq
(74) *Attorney, Agent, or Firm* — Birch, Stewart, Kolasch & Birch, LLP

(57) ABSTRACT

A method for running a DRX (Discontinuous Reception) cycle at a user equipment in a wireless communication system is disclosed. The method includes steps of receiving configuration information for a long DRX cycle and a short DRX cycle; receiving at least one data unit including one or more DRX command MAC (medium access control) CEs (control elements) in a predetermined period; and running one of the long DRX cycle and the short DRX cycle according to a total number of DRX command MAC CEs.

9 Claims, 12 Drawing Sheets

(58) Field of Classification Search
USPC .................................................. 370/310, 311
See application file for complete search history.

(56) References Cited

U.S. PATENT DOCUMENTS

| | | |
|---|---|---|
| 2011/0170420 A1 | 7/2011 | Xi et al. |
| 2011/0199910 A1 | 8/2011 | Oh et al. |
| 2014/0307606 A1 | 10/2014 | Cai et al. |
| 2015/0264645 A1* | 9/2015 | Virtej ................ H04W 52/0216 370/311 |

FOREIGN PATENT DOCUMENTS

| KR | 10-2011-0095092 A | 8/2011 |
|---|---|---|
| KR | 10-2012-0123392 A | 11/2012 |

* cited by examiner

FIG. 3
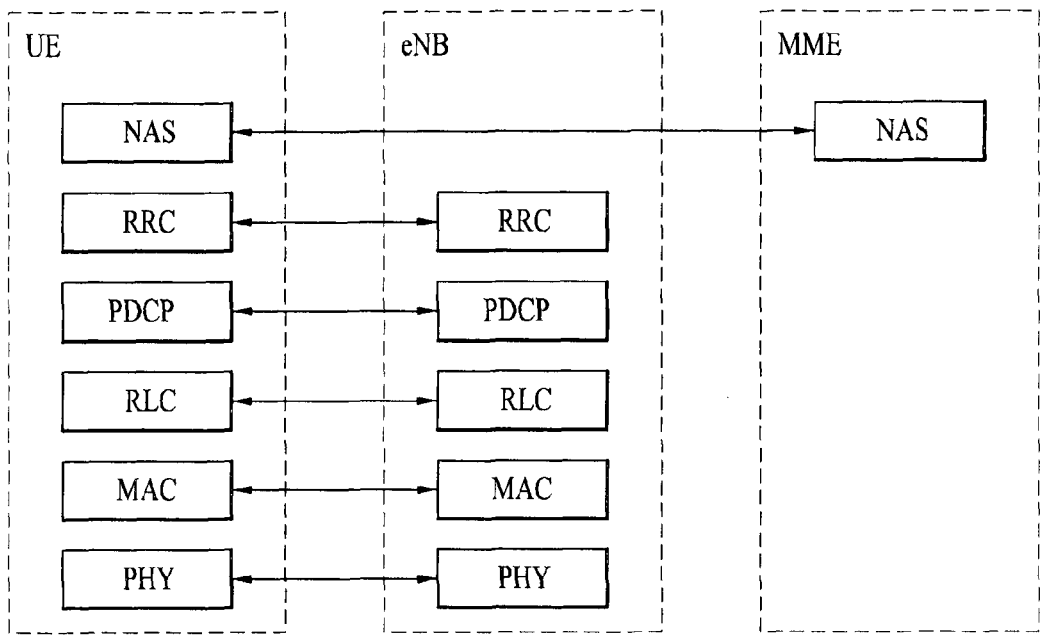
(a) Control-Plane Protocol Stack
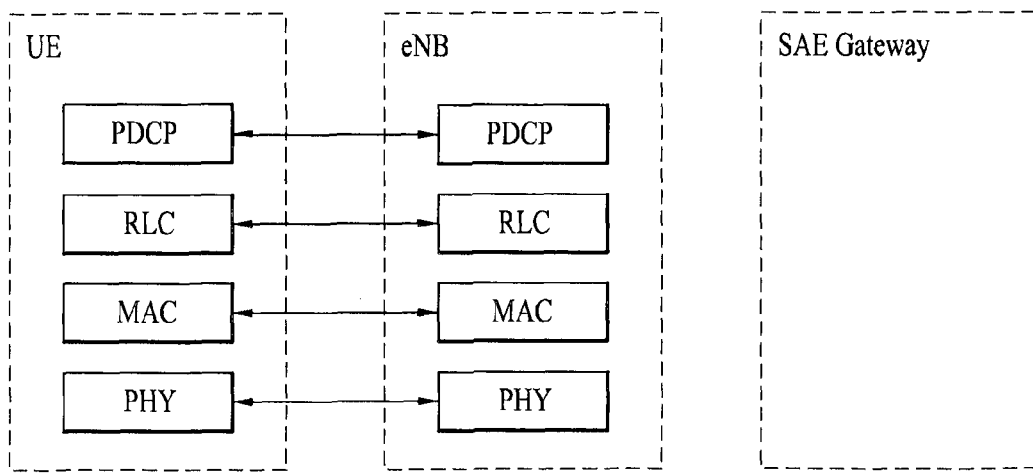
(b) User-Plane Protocol Stack

METHOD FOR APPLYING TIMER FOR DISCONTINUOUS RECEPTION PROCEDURE IN WIRELESS COMMUNICATION SYSTEM AND AN APPARATUS THEREFOR

CROSS REFERENCE TO RELATED APPLICATIONS

This application is the National Phase of PCT International Application No. PCT/KR2014/000304, filed on Jan. 10, 2014, which claims priority under 35 U.S.C. 119(e) to U.S. Provisional Application No. 61/753,386, filed on Jan. 16, 2013, all of which are hereby expressly incorporated by reference into the present application.

TECHNICAL FIELD

The present invention relates to a wireless communication system and, more particularly, to a method for applying a timer for a discontinuous reception (DRX) procedure in wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARD)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Problem

Based on the above discussion, the present invention proposes a method for applying a timer for a discontinuous reception (DRX) procedure in wireless communication system and an apparatus therefor.

Technical Solution

In accordance with an embodiment of the present invention, a method for running a DRX (Discontinuous Reception) cycle at a user equipment in a wireless communication system includes receiving configuration information for a long DRX cycle and a short DRX cycle; receiving at least one data unit including one or more DRX command MAC (medium access control) CEs (control elements) in a predetermined period; and running one of the long DRX cycle and the short DRX cycle according to a total number of DRX command MAC CEs. Preferably, the at least one data unit can comprise multiple data units.

Preferably, the predetermined period indicates one subframe or one TTI (transmission time interval). Or the predetermined period indicates multiple subframes or multiple TTIs (transmission time intervals).

More preferably, the step of running one of the long DRX cycle and the short DRX cycle comprises running the short DRX cycle if the total number of DRX command MAC CEs is a first value. Here, the first value may be 1.

Further, the step of running one of the long DRX cycle and the short DRX cycle comprises running the long DRX cycle if the total number of DRX command MAC CEs is a second value. Here, the second value is an integer greater than 1.

More preferably, the step of receiving configuration information comprises running the short DRX cycle. Here, the predetermined period corresponds to the short DRX cycle. In this case, the method may further comprise a step of stopping the short DRX cycle if the total number of DRX command MAC CEs is an integer greater than 1.

It is to be understood that both the foregoing general description and the following detailed description of the present invention are exemplary and explanatory and are intended to provide further explanation of the invention as claimed.

Advantageous Effects

According to embodiments of the present invention, the network and the user equipment can efficiently apply the timer for the DRX procedure in the wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 3 is a diagram showing a control plane and a user plane of a radio interface protocol between a UE and an E-UTRAN based on a 3rd generation partnership project (3GPP) radio access network standard.

BEST MODE

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
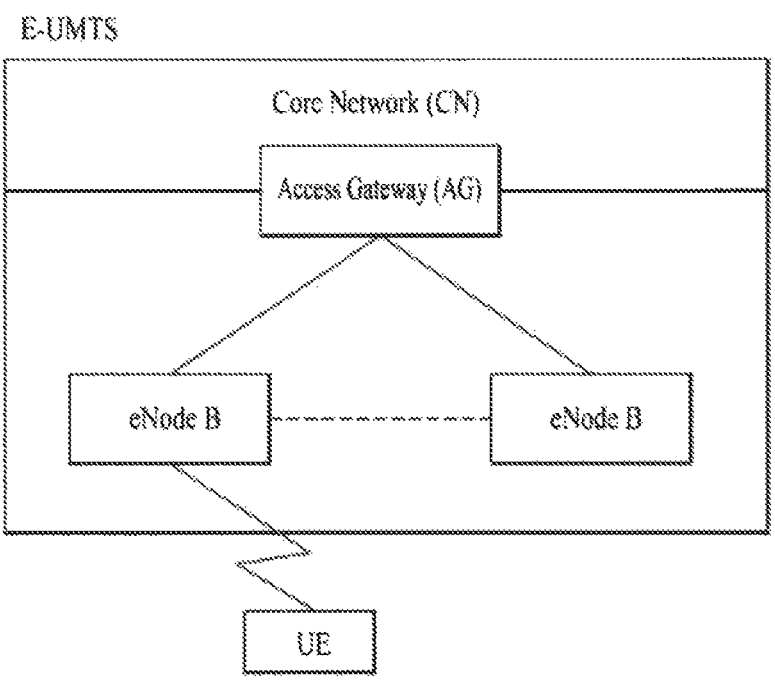
FIG. 1 is a diagram showing a network structure of an Evolved Universal Mobile Telecommunications System (E-UMTS) as an example of a wireless communication system.
Figure 2:
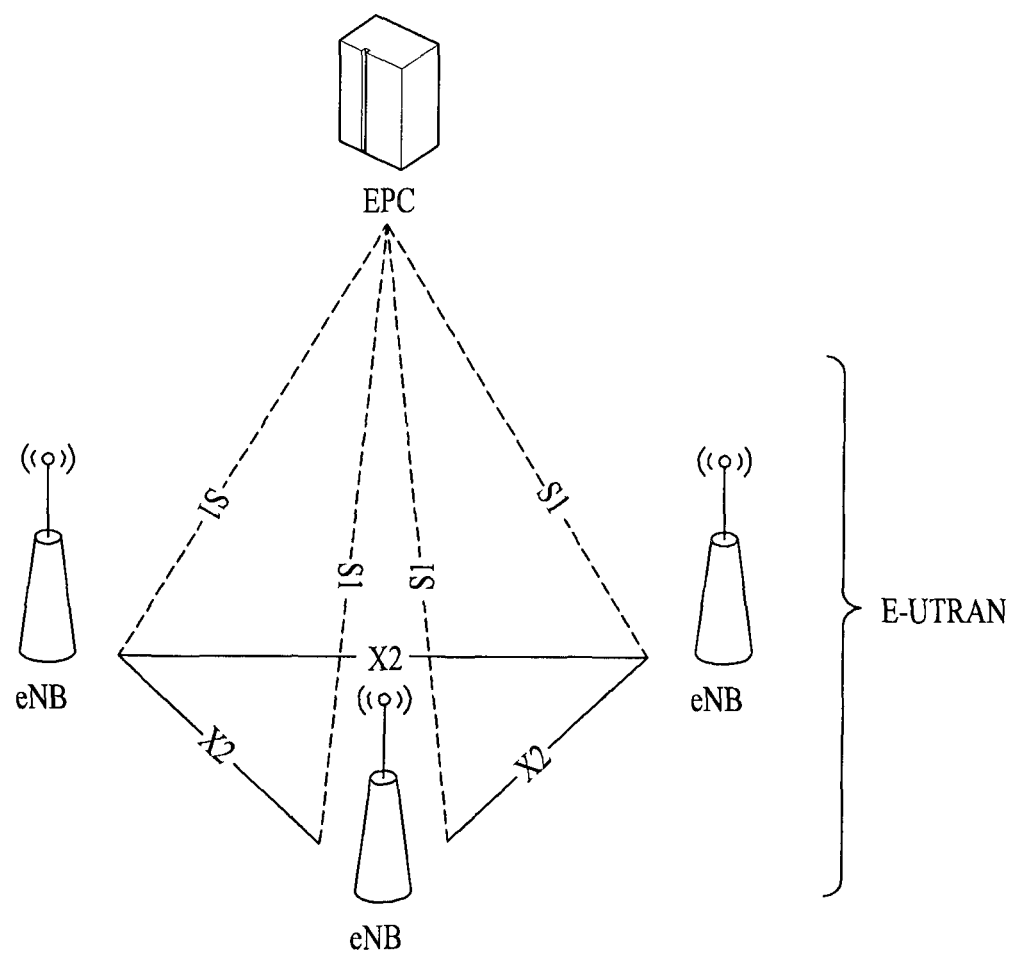
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
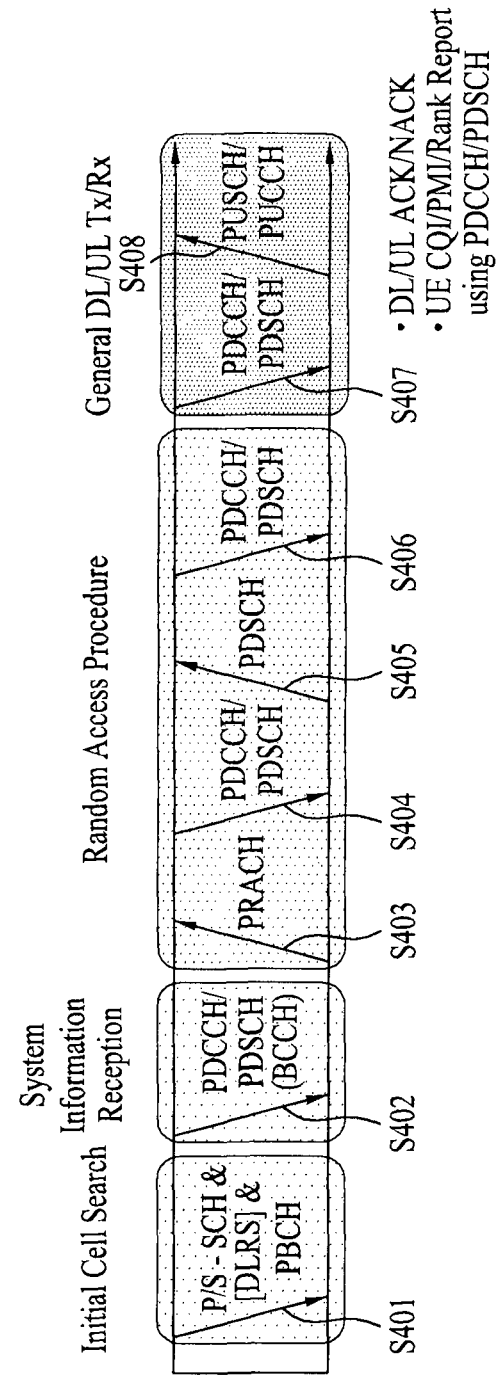
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
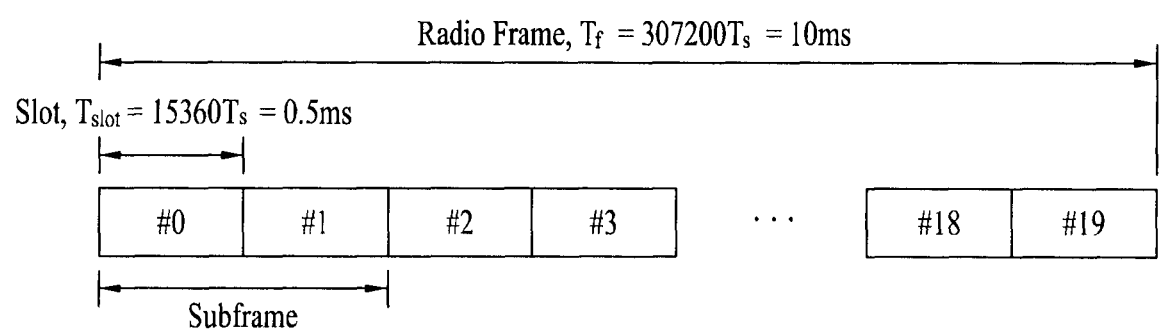
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms (327200×Ts) and is divided into 10 subframes having the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10−8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Hereinafter, an RRC state of a UE and an RRC connection method will be described.

The RRC state indicates whether the RRC layer of the UE is logically connected to the RRC layer of the E-UTRAN. When the RRC connection is established, the UE is in a RRC_CONNECTED state. Otherwise, the UE is in a RRC_IDLE state.

The E-UTRAN can effectively control UEs because it can check the presence of RRC_CONNECTED UEs on a cell basis. On the other hand, the E-UTRAN cannot check the presence of RRC_IDLE UEs on a cell basis and thus a CN manages RRC_IDLE UEs on a TA basis. A TA is an area unit larger than a cell. That is, in order to receive a service such as a voice service or a data service from a cell, the UE needs to transition to the RRC_CONNECTED state.

In particular, when a user initially turns a UE on, the UE first searches for an appropriate cell and camps on the cell in the RRC_IDLE state. The RRC_IDLE UE transitions to the RRC_CONNECTED state by performing an RRC connection establishment procedure only when the RRC_IDLE UE needs to establish an RRC connection. For example, when uplink data transmission is necessary due to call connection attempt of a user or when a response message is transmitted in response to a paging message received from the E-UTRAN, the RRC_IDLE UE needs to be RRC connected to the E-UTRAN.

Figure 6:
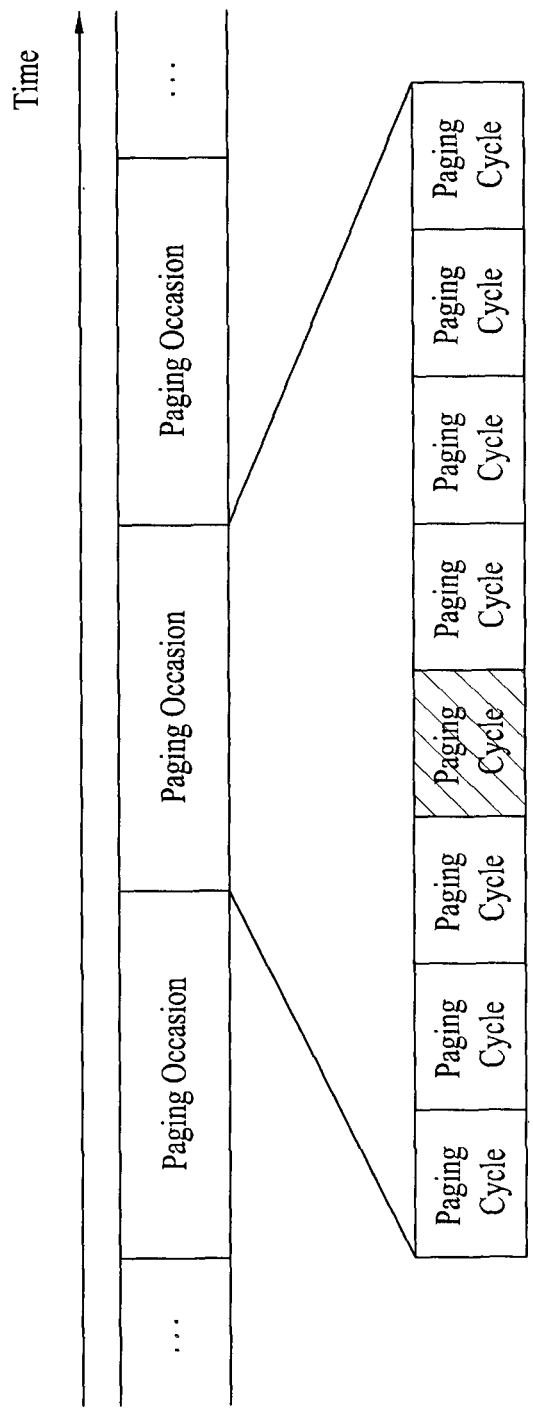
FIG. 6 is a diagram showing a general transmission and reception method using a paging message.

FIG. 6 is a diagram showing a general transmission and reception method using a paging message.

Referring to FIG. 6, the paging message includes a paging record having paging cause and UE identity. Upon receiving the paging message, the UE may perform a discontinuous reception (DRX) operation in order to reduce power consumption.

In detail, a network configures a plurality of paging occasions (POs) in every time cycle called a paging DRC cycle and a specific UE receives only a specific paging occasion and acquires a paging message. The UE does not receive a paging channel in paging occasions other than the specific paging occasion and may be in a sleep state in order to reduce power consumption. One paging occasion corresponds to one TTI.

The eNB and the UE use a paging indicator (PI) as a specific value indicating transmission of a paging message. The eNB may define a specific identity (e.g., paging-radio network temporary identity (P-RNTI)) as the PI and inform the UE of paging information transmission. For example, the UE wakes up in every DRX cycle and receives a subframe to determine the presence of a paging message directed thereto. In the presence of the P-RNTI on an L1/L2 control channel (a PDCCH) in the received subframe, the UE is aware that a paging message exists on a PDSCH of the subframe. When the paging message includes an ID of the UE (e.g., an international mobile subscriber identity (IMSI)), the UE receives a service by responding to the eNB (e.g., establishing an RRC connection or receiving system information).

Hereinafter, a DRX (Discontinuous Reception) will be described. The DRX is a method for saving of a power consumption by allowing to monitor a PDCCH discontinuously.

Figure 7:
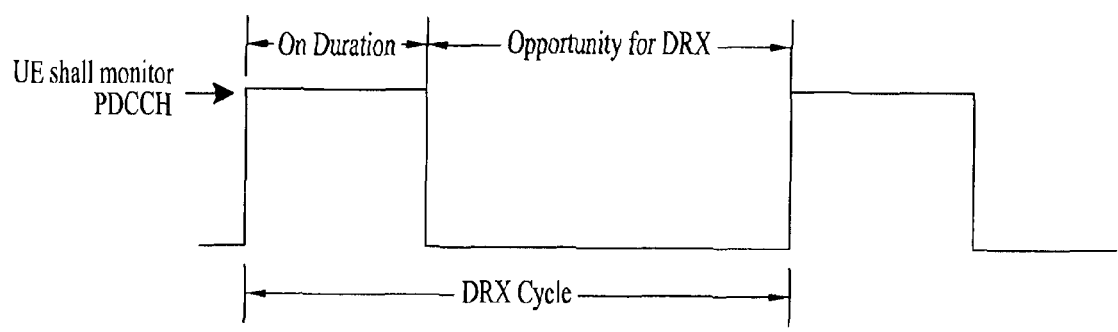
FIG. 7 is a diagram showing a concept DRX (Discontinuous Reception).

FIG. 7 is a diagram showing a concept DRX (Discontinuous Reception).

Referring to FIG. 7, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as On Duration. On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running. The value of each of the timers is defined as the number of subframes. The number of subframes is counted until the value of a timer is reached. If the value of the timer is satisfied, the timer expires.

Additionally, the UE should perform PDCCH monitoring during random access or when the UE transits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 8:
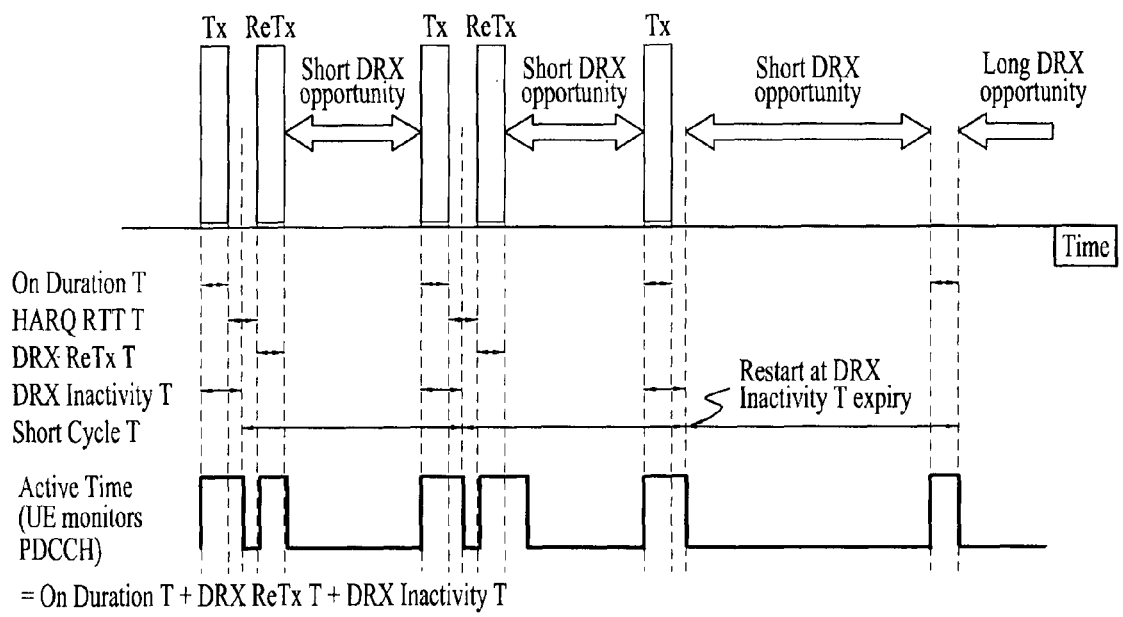
FIG. 8 is a diagram showing a method for a DRX operation in the LTE system.

FIG. 8 is a diagram showing a method for a DRX operation in the LTE system. Referring to FIG. 8, the UE may be configured by RRC with a DRX functionality shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

Furthermore, if the Short DRX Cycle is used and [(SFN*10)+subframe number] modulo (shortDRX-Cycle) is (drxStartOffset) modulo (shortDRX-Cycle), or if the Long DRX Cycle is used and [(SFN*10)+subframe number] modulo (longDRX-Cycle) is drxStartOffset, the UE shall start onDurationTimer.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer. Here, the PDCCH-subframe is defined as a subframe with PDCCH. That is, the PDCCH-subframe is a subframe on which the PDCCH can be transmitted. Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

More specifically, when the UE is configured with DRX, the UE saves power consumption by discontinuously monitoring the PDCCH for DL/UL transmission. The DRX operation is specified by the DRX-config IE in the RRC signaling, which includes onDurationTimer, drx-InactivityTimer, drx-RetransmissionTimer, drxStartOffset, short-DRX-cycle, and drxShortCycleTimer. In addition to the timers, the DRX operation is explicitly handled by the MAC signaling, i.e., a DRX Command MAC control element.

Upon receiving a DRX Command MAC control element in a MAC PDU, the UE starts using the Short DRX cycle and starts the drxShortCycleTimer if the UE is configured with the Short DRX cycle; otherwise the UE uses the Long DRX Cycle. Once the UE starts using the Short DRX cycle, the UE keeps using the Short DRX cycle and does not move to the Long DRX cycle unless the drxShortCycleTimer expires.

Considering the traffic and scheduling policy, for some cases, it would be desirable for the UE to use the Long DRX cycle even though the drxShortCycleTimer does not expire yet. For example, when the eNB has only a small data transmission and expects that there is no further data transmission to the UE, the UE can save power consumption by using the Long DRX cycle instead of continuing use of the Short DRX cycle until when the drxShortCycleTimer expires.

In the prior art, only a single DRX Command MAC CE is included in a MAC PDU, and the DRX Command MAC CE only stops continuous reception and makes the UE to start using the Short DRX cycle. There is no method to stop using the Short DRX cycle and makes the UE to start using the Long DRX cycle immediately.

Therefore, in the present invention, it is suggested that the number of the same control elements in one message indicates different control information. For example, when a UE is configured with multiple DRX cycles, if the UE receives at least one DRX Command MAC CE in a subframe, the UE sets the level of DRX cycle to be used according to the number of DRX Command MAC CEs received in the subframe.

First Embodiment

In the First Embodiment, the eNB can send two DRX Command MAC CEs in a subframe or TTI to make the UE to start using the Long DRX Cycle.

When the eNB configures the DRX functionality to the UE, the eNB sends an RRC signaling, including i) the timers onDurationTimer, drx-InactivityTimer, drx-Retransmission-Timer, ii) the longDRX-Cycle, the value of the drxStartOffset, and iii) optionally, the drxShortCycleTimer and short-DRX-Cycle.

In case a UE is configured with Short and Long DRX cycles, in order to make the UE to start using the Long DRX cycle, the eNB can send two DRX Command MAC CEs in the same subframe or TTI. In the other hand, if the eNB wants to make the UE to start using Short DRX cycle, the eNB sends only one DRX Command MAC CE in one subframe or TTI.

When the eNB sends two DRX Command MAC CEs in the same subframe or TTI, each DRX Command MAC CE can be separately included in one MAC PDU, and the eNB sends two MAC PDUs including two DRX Command MAC CEs in a subframe or TTI. Or, two DRX Command MAC CEs can be included in one MAC PDU together, and the eNB sends one MAC PDU including two DRX Command MAC CEs in a subframe or TTI.

More specifically, it is assumed that the UE is configured with both of the Short DRX cycle and the Long DRX cycle, When the UE receives a DRX Command MAC CE in a subframe or TTI, the UE stops onDurationTimer and drx-InactivityTimer. And the UE checks how many DRX Command MAC CEs are included in the same subframe or TTI.

If the UE receives a single DRX Command MAC CE in a MAC PDU, or in one subframe, the UE starts or restarts drxShortCycleTimer, and uses the Short DRX cycle. Then, when drxShortCycleTimer expires, the UE uses the Long DRX cycle.

If the UE receives two DRX Command MAC CEs in one subframe or TTI, the UE stops drxShortCycleTimer, if running. Therefore, the UE uses the Long DRX cycle.

If the UE is configured with only the Long DRX cycle, when the UE receives at least one DRX Command MAC CE in a subframe or TTI, the UE stops onDurationTimer and drx-InactivityTimer. Then, the UE uses the Long DRX cycle.

Figure 9:
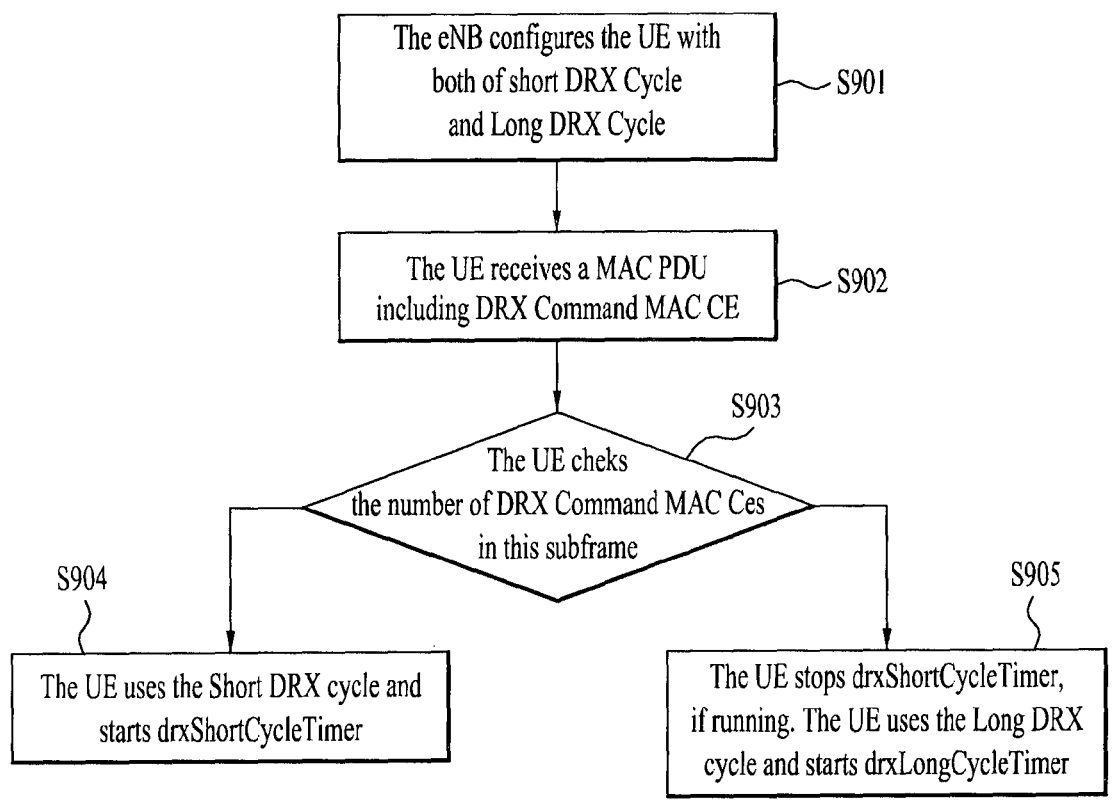
FIG. 9 is a flow chart showing a method for applying the Long DRX Cycle or the Short DRX Cycle according to the first embodiment.

FIG. 9 is a flow chart showing a method for applying the Long DRX Cycle or the Short DRX Cycle according to the first embodiment. Especially, according to FIG. 9, the UE chooses which DRX cycle to use according to the number of DRX Command MAC CEs in the same MAC PDU.

Referring to FIG. 9, in S901, the eNB configures the UE with both of the Short DRX cycle and the Long DRX cycle. In S902, the UE receives a MAC PDU including at least one DRX command MAC CE from the eNB.

Next, the UE checks the number of DRX command MAC CE received in this subframe or TTI in S903. If the number of DRX command MAC CE is 1, the UE uses the Short DRX cycle and starts drxShortCycleTimer in S904.

But, if the number of DRX command MAC CE is 2, the UE stops drxShortCycleTimer, if running. And then, the UE uses the Long DRX cycle and starts drxLongCycleTimer in S905.

Figure 10:
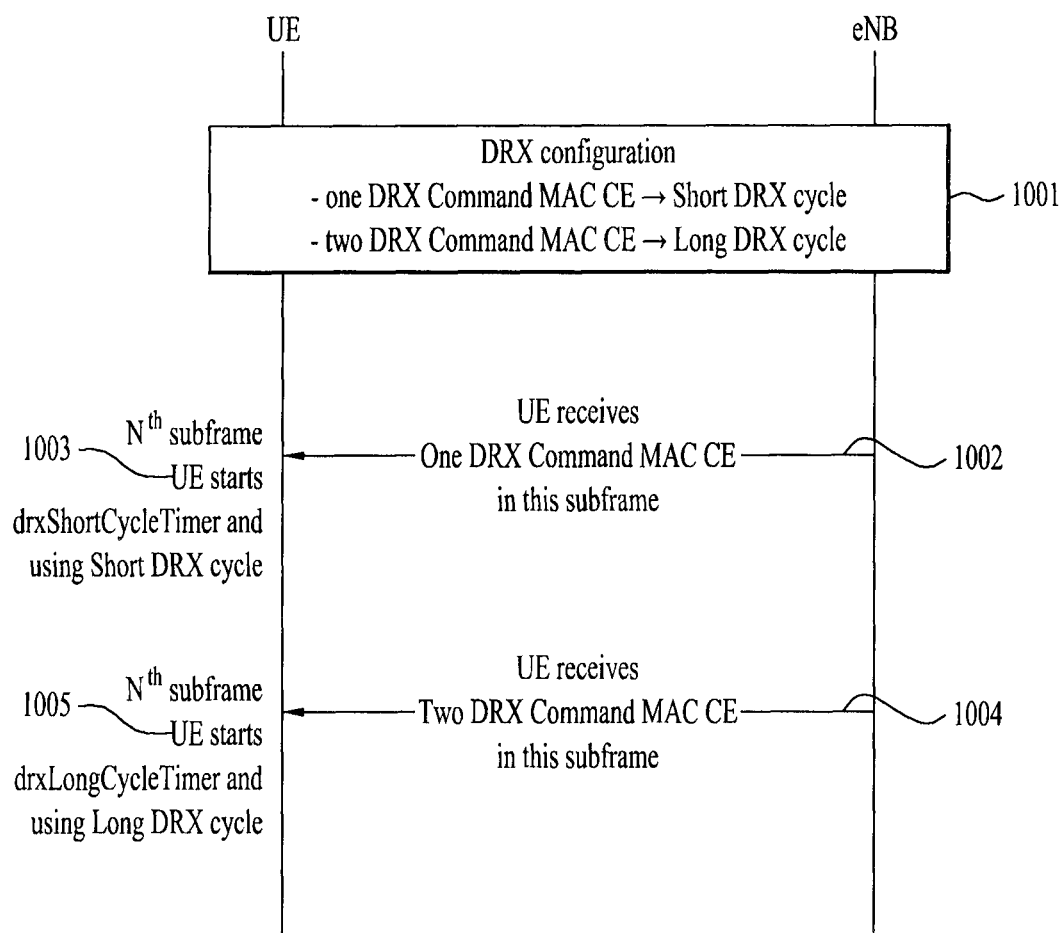
FIG. 10 is another flow chart showing a method for applying the Long DRX Cycle or the Short DRX Cycle according to the first embodiment.

FIG. 10 is another flow chart showing a method for applying the Long DRX Cycle or the Short DRX Cycle according to the first embodiment.

Referring to FIG. 10, in S1001, the eNB configures the UE with both of the Short DRX cycle and the Long DRX cycle using a DRX configuration. In this DRX configuration, one DRX Command MAC CE corresponds to the Short DRX cycle and two DRX Command MAC CEs corresponds to the Long DRX cycle.

In S1002, the UE receives one DRX Command MAC CE on $N^{th}$ subframe. In this case, the UE starts the drxShortCycleTimer and uses the Short DRX cycle in S1003. On $N+M^{th}$ subframe, the UE receives two DRX Command MAC CEs in S1004. Then although the drxShortCycleTimer does not expired, the UE starts the drxLongCycleTimer and uses the Long DRX cycle in S1005.

Second Embodiment

In the Second Embodiment, the eNB can send multiple DRX Command MAC CEs in a subframe or TTI to make the UE to start using the Long DRX Cycle.

In case a UE is configured with Short and Long DRX cycles, in order to make the UE to start using the Long DRX cycle, the eNB can send multiple DRX Command MAC CEs in the same subframe or TTI. If the eNB wants to make the UE to start using Short DRX cycle, the eNB sends only one DRX Command MAC CE in one subframe or TTI.

When the eNB sends multiple DRX Command MAC CEs in the same subframe or TTI, each DRX Command MAC CE can be separately included in one MAC PDU, and the eNB sends multiple MAC PDUs in a subframe or TTI. Or multiple DRX Command MAC CEs can be included in one MAC PDU together, and the eNB sends one MAC PDU including multiple DRX Command MAC CEs in a subframe or TTI.

More specifically, it is assumed that the UE is configured with both of the Short DRX cycle and the Long DRX cycle. When the UE receives a DRX Command MAC CE in a subframe or TTI, the UE stops onDurationTimer anddrx-InactivityTimer. Then, the UE checks how many DRX Command MAC CEs are included in the same subframe or TTI.

If the UE receives a single DRX Command MAC CE in a MAC PDU, or in one subframe, the UE starts or restarts drxShortCycleTimer, and uses the Short DRX cycle. Then, when drxShortCycleTimer expires, the UE uses the Long DRX cycle.

But, if the UE receives multiple DRX Command MAC CEs in one subframe or TTI, the UE stops drxShortCycleTimer, if running. Then, the UE uses the Long DRX cycle.

If the UE is configured with only the Long DRX cycle, when the UE receives at least one DRX Command MAC CE in a subframe or TTI, the UE stops onDurationTimer and drx-InactivityTimer. Then the UE uses the Long DRX cycle.

Third Embodiment

In the Third Embodiment, the eNB can re-send the DRX Command MAC CEs again in a different subframe or TTI after the eNB firstly sends the DRX Command MAC CE to make the UE to start using the Long DRX Cycle.

When the eNB configures the DRX functionality to the UE, the eNB sends an RRC signaling, including i) the timers onDurationTimer, drx-InactivityTimer, drx-Retransmission-Timer ii) the longDRX-Cycle, the value of the drxStartOffset iii) optionally, the drxShortCycleTimer and shortDRX-Cycle. Additionally, the RRC signaling includes iv) information on a period of time or the number of subframes for drxCycleChange optionally.

In case a UE is configured with Short and Long DRX cycles, in order to make the UE to start using the Long DRX cycle, the eNB can send additional DRX Command MAC CE within a specific period i.e., drxCycleChange after the eNB firstly sends the DRX Command MAC CE. Or, the eNB sends additional DRX Command MAC CE more than drxCycleChange after the eNB firstly sends the DRX Command MAC CE.

However, if the eNB wants to make the UE to start using Short DRX cycle, the eNB sends only one DRX Command MAC CE in one subframe or TTI.

In the other hand, if the UE is configured with both of the Short DRX cycle and the Long DRX cycle, when the UE receives a DRX Command MAC CE in a subframe or TTI, the UE stops onDurationTimer and drx-InactivityTimer. Then, the UE checks whether the UE received another DRX Command MAC CE within drxCycleChange that the UE receives the DRX Command MAC CE in this subframe, or, the UE checks whether the UE received another DRX Command MAC CE more than drxCycleChange before the UE receives the DRX Command MAC CE in this subframe.

If the UE received another DRX Command MAC CE within drxCycleChange that the UE receives the DRX Command MAC CE in this subframe, or if the UE received another DRX Command MAC CE more than drxCycleChange before the UE receives the DRX Command MAC CE in this subframe, the UE stops drxShortCycleTimer, if running. Then the UE uses the Long DRX cycle.

Else, the UE starts or restarts drxShortCycleTimer and uses the Short DRX cycle. Then, when drxShortCycleTimer expires, the UE uses the Long DRX cycle.

Figure 11:
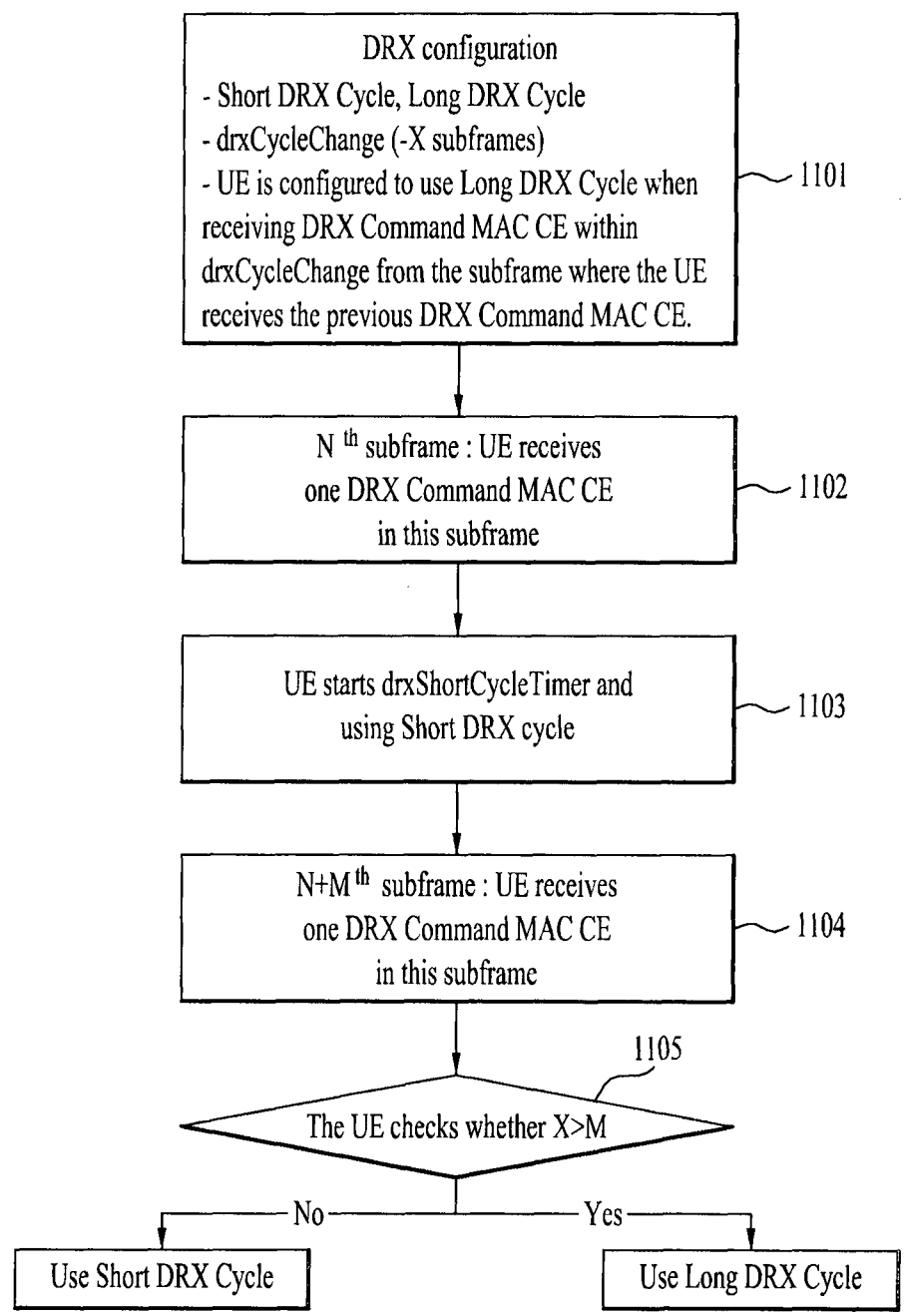
FIG. 11 is a flow chart showing a method for applying the Long DRX Cycle or the Short DRX Cycle according to the third embodiment.

FIG. 11 is a flow chart showing a method for applying the Long DRX Cycle or the Short DRX Cycle according to the third embodiment.

Referring to FIG. 11, the UE firstly receives the DRX configuration information from the eNB in S1101. The DRX configuration information indicates that the Short DRX cycle is used when one DRX Command MAC CE is received in a subframe and the Long DRX cycle is used when another DRX Command MAC CE is received within drxCycleChange (X subframes) from the subframe.

In S1102, the UE receives one DRX Command MAC CE on $N^{th}$ subframe. In this case, the UE starts the drxShortCycleTimer and uses the Short DRX cycle in S1103. Although the drxShortCycleTimer does not expired, the UE receives another DRX Command MAC CE on $N+M^{th}$ subframe in S1104. Then, the UE checks whether the $N+M^{th}$ subframe is within X subframes from the $N^{th}$ subframe in S1105.

If the $N+M^{th}$ subframe is within X subframes from the $N^{th}$ subframe, the UE starts drxLongCycleTimer and uses the Long DRX cycle. Else, the UE uses the Short DRX cycle continuously.

According to the present invention, the eNB can stop using the Short DRX cycle and makes the UE to start using the Long DRX cycle immediately.

Figure 12:
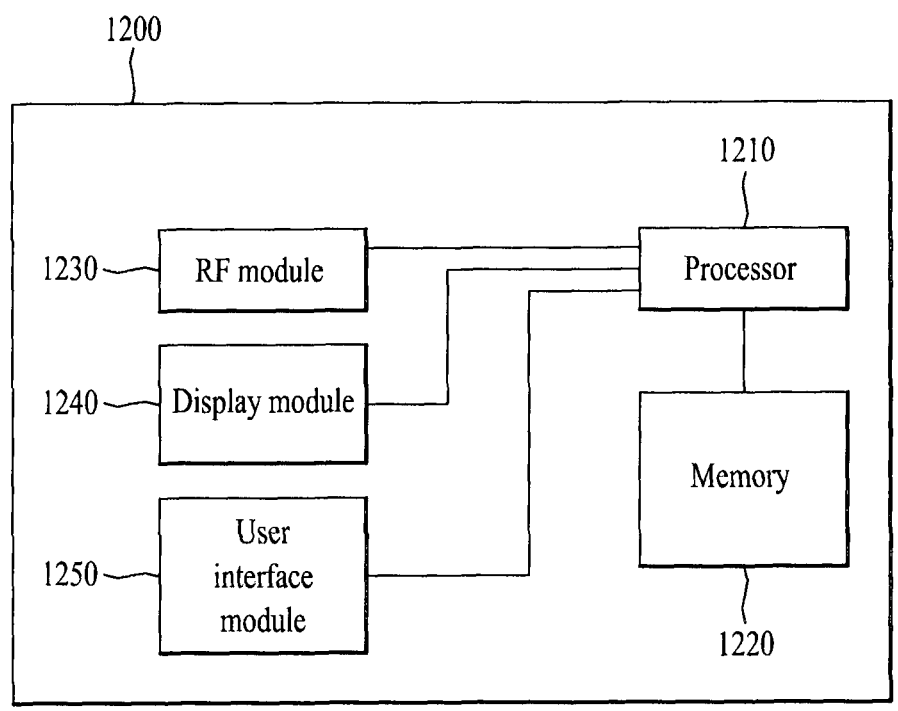
FIG. 12 is a block diagram of a communication apparatus according to an embodiment of the present invention.

FIG. 12 is a block diagram illustrating a communication apparatus in accordance with an embodiment of the present invention.

Referring to FIG. 12, a communication device 1200 includes a processor 1210, a memory 1220, an Radio Frequency (RF) module 1230, a display module 1240, and a user interface module 1250.

The communication device 1200 is illustrated for convenience of the description and some modules may be omitted. Moreover, the communication device 1200 may further include necessary modules. Some modules of the communication device 1200 may be further divided into sub-modules. The processor 1200 is configured to perform operations according to the embodiments of the present invention exemplarily described with reference to the figures. Specifically, for the detailed operations of the processor 1200, reference may be made to the contents described with reference to FIGS. 1 to 11.

The memory 1220 is connected to the processor 1210 and stores operating systems, applications, program code, data, and the like. The RF module 1230 is connected to the processor 1210 and performs a function of converting a baseband signal into a radio signal or converting a radio signal into a baseband signal. For this, the RF module 1230 performs analog conversion, amplification, filtering, and frequency upconversion or inverse processes thereof. The display module 1240 is connected to the processor 1210 and displays various types of information. The display module 1240 may include, but is not limited to, a well-known element such as a Liquid Crystal Display (LCD), a Light Emitting Diode (LED), or an Organic Light Emitting Diode (OLED). The user interface module 1250 is connected to the processor 1210 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for applying a timer for a discontinuous reception (DRX) procedure in wireless communication system has been described centering on an example applied to the 3GPP LTE system, the present invention is applicable to a variety of wireless communication systems in addition to the 3GPP LTE system.

The invention claimed is:

1. A method for running a DRX (Discontinuous Reception) cycle at a UE (user equipment) in a wireless communication system, the method comprising:

receiving, by the UE, configuration information for a long DRX cycle and a short DRX cycle from an eNB (eNode B);

receiving, by the UE, at least one data unit including one or more DRX command MAC (medium access control) CEs (control elements) in a predetermined period from the eNB;

running, by the UE, one of the long DRX cycle and the short DRX cycle according to a total number of DRX command MAC CEs; and selectively monitoring, by the UE, a physical downlink control channel (PDCCH) based on the running one of the long DRX cycle and the short DRX cycle, wherein the running one of the long DRX cycle and the short DRX cycle comprises not monitoring the PDCCH during the running of the short DRX cycle if the total number of DRX command MAC CEs is a first value.

2. The method of claim 1, wherein the predetermined period indicates one subframe or one TTI (transmission time interval).

3. The method of claim 1, wherein the predetermined period indicates multiple subframes or multiple TTIs (transmission time intervals).

4. The method of claim 1, wherein the running one of the long, DRX cycle and the short DRX cycle comprises not monitoring the PDCCH during the running of the long DRX cycle if the total number of DRX command MAC CEs is a second value.

5. The method of claim 4, wherein the second value is an integer greater than 1.

6. The method of claim 1, wherein the at least one data unit comprises multiple data units.

7. The method of claim 1, wherein:
the receiving configuration information comprises running the short DRX cycle, and
the predetermined period is the short DRX cycle.

8. The method of claim 1, further comprising:
stopping, by the UE, the short DRX cycle if the total number of DRX command MAC CEs is an integer greater than 1.

9. The method of claim 1, wherein the first value is 1.

* * * * *